(12) United States Patent
Gamba

(10) Patent No.: US 6,881,781 B1
(45) Date of Patent: Apr. 19, 2005

(54) MODELING COMPOUND

(75) Inventor: Guillermo Gamba, Buenos Aries (AR)

(73) Assignee: The Wingum Company, Miami, FL (US)

( * ) Notice: Subject to any disclaimer, the term of this patent is extended or adjusted under 35 U.S.C. 154(b) by 184 days.

(21) Appl. No.: 10/725,321

(22) Filed: Dec. 1, 2003

(51) Int. Cl.$^7$ ................................................. C08L 23/22
(52) U.S. Cl. .................. 524/579; 524/302; 524/567; 524/497; 524/447; 524/474; 106/244; 106/249; 523/351
(58) Field of Search .............................. 524/302, 579, 524/567, 497, 447, 474

(56) References Cited

U.S. PATENT DOCUMENTS

| | | | | |
|---|---|---|---|---|
| 2,541,851 A | * | 2/1951 | Wright | ................. 524/701 |
| 3,317,444 A | * | 5/1967 | Topcik | ................. 524/246 |
| 3,384,498 A | * | 5/1968 | Ahrabi | ................. 106/38.51 |
| 3,402,237 A | * | 9/1968 | Holzinger | ............... 264/272.11 |
| 3,565,815 A | | 2/1971 | Christy | |
| 3,634,280 A | | 1/1972 | Dean et al. | |
| 3,677,977 A | | 7/1972 | Bush et al. | |
| 3,677,997 A | * | 7/1972 | Kaiser et al. | ................. 524/377 |
| 3,804,654 A | | 4/1974 | Lin | |
| 3,904,566 A | * | 9/1975 | Cudby | ................. 523/139 |
| 4,076,547 A | | 2/1978 | Lester et al. | |
| 4,172,054 A | | 10/1979 | Ogawa et al. | |
| 4,336,071 A | | 6/1982 | Schnorrer | |
| 4,735,660 A | | 4/1988 | Cane | |
| 5,025,058 A | * | 6/1991 | Senoo | ................. 524/436 |
| 5,171,766 A | * | 12/1992 | Mariano et al. | ............ 523/218 |
| 5,258,068 A | * | 11/1993 | Shapero et al. | .......... 106/205.2 |
| 5,310,421 A | | 5/1994 | Shapero et al. | |
| 5,873,933 A | | 2/1999 | Mackey | |
| 6,437,038 B1 | * | 8/2002 | Chen | .......................... 524/474 |
| 6,464,899 B1 | * | 10/2002 | Haas et al. | ............... 252/389.1 |

FOREIGN PATENT DOCUMENTS

| | | | | | |
|---|---|---|---|---|---|
| DE | 2 222 782 | * | 5/1972 | ............... | C08J/1/00 |
| DE | 27 10 115 | * | 3/1977 | ............ | C08L/23/22 |
| GB | 1 067 041 | * | 4/1967 | ............ | C08D/9/00 |

* cited by examiner

*Primary Examiner*—David W. Wu
*Assistant Examiner*—Rip A. Lee
(74) *Attorney, Agent, or Firm*—Schweitzer Cornman Gross & Bondell LLP

(57) ABSTRACT

A non-toxic malleable, bounceable modeling compound stretchable in a manner similar to chewing gum which is particularly suitable for children. The compound is comprised essentially of a butyl rubber, vulcanized vegetable oil, one or more softening agents, an inorganic filler material, antioxidant and binder. The pliable compound can retain a molded shape for years and is an ideal sculpting material, stress reliever, and aid for improving dexterity. The compound is produced according to a tri-phase process that does not require heating or baking.

18 Claims, No Drawings

MODELING COMPOUND

FIELD OF THE INVENTION

The invention relates generally to a novel malleable modeling compound and in particular, to a non-toxic, extremely pliable compound suitable for children and adults.

BACKGROUND OF THE INVENTION

Modeling compounds such as clays and putties are widely known and have been commercially available for decades. The compounds are commonly used as play toys, creative materials, and orthopedic aids.

Common examples of putties include, for example, borosiloxane bouncing putties shown in U.S. Pat. No. 2,541,851 issued to Wright and U.S. Pat. No. 3,677,997 issued to Kaiser, et al. Unlike conventional modeling clays, these compounds do not dry out or harden over time. While widely available, bouncing putties tend to have an undesirable greasy or oily tactile feel and may become permanently embedded in carpet and clothing fibers if left unattended. In addition, within minutes after molding bouncing putties into a desired shape, the compounds will flow or collapse downwardly like viscous fluids. This characteristic renders bouncing putties unacceptable for educational or creative uses.

U.S. Pat. No. 5,171,766 issued to Mariano discloses a non-oil based modeling dough resistant to flaking and cracking. However, a bounceable compound is not adequately obtained without reducing the shelf-life of the dough.

U.S. Pat. No. 3,384,498 issued to Ahrabi discloses a plastic modeling compound comprising a significant portion of guar gum to provide an elastic, moldable compound suitable for utilization as a novelty item.

More recently, U.S. Pat. No. 5,258,068 issued to Shapero, et al., sets forth a safe non-toxic play material including, among other ingredients, guar gum, providing a play material exhibiting an improved tactile feel.

While the aforementioned inventions all exhibit some desirable qualities of modeling compounds and novelty toys, such as the ability to bounce or retain shape, flexibility, pliability, etc., it is highly desirable to provide a modeling compound exhibiting all of these characteristics and more. In particular, it is also imperative to provide a non-toxic modeling compound due to the inherent risk of chewing or consumption of such compounds by young children.

Accordingly, it is an object of the present invention to provide an improved non-toxic modeling compound that is highly malleable and pliable.

Another object of the present invention is to provide a flexible, stretchable non-hardening modeling compound having the ability to retain a formed shape.

A further object of the present invention is to provide a non-greasy modeling compound having a unique tactile feel that will not become embedded into carpet, furniture and clothing.

A still further object of the present invention is to provide a method for the manufacture of a modeling compound which does not require heating or baking.

SUMMARY OF THE INVENTION

The above objects and advantages are achieved by an improved non-toxic modeling compound comprising a novel combination of known ingredients, including a rubber component, oils, filler materials, an antioxidant and other desirable additives.

The critical components of the invention include a copolymer rubber component, preferably a butyl rubber, and vulcanized vegetable oil, commonly known as factice. Modeling compounds formulated in accordance with this invention also include at least one filler, softening agent and preferably an antioxidant. Colorants and perfumes may be optionally added to complement the base ingredients by enhancing the appearance of the modeling compound.

As would be recognized by one skilled in the art, the major application of butyl rubber, the preferred rubber component, is in the lining of tires and as a base ingredient in chewing gum. The exemplary properties exhibited butyl rubbers, including flexibility and non-toxicity, are demonstrated in a modeling compound when formed in combination with the ingredients described herein. The final product is a non-toxic, non-sticky, cohesive, malleable modeling compound stretchable in a manner similar to chewing gum.

The invention also contemplates a preferred tri-phase process of manufacturing the modeling compound. Desirably, the method of the manufacture does not require heating or baking to obtain the finished product.

DETAILED DESCRIPTION

To achieve the above-described objects and advantages, a modeling compound according to the present invention comprises a copolymer rubber component of a butyl rubber and a vulcanized vegetable oil polymer (VVO). Though additional ingredients commonly found in modeling compounds and the like are utilized to manufacture the compound described herein, the butyl rubber/VVO combination is particularly desirable as VVO serves to facilitate the incorporation of the necessary additives into the butyl rubber.

A copolymer rubber, particularly a butyl rubber, is utilized to form the basic material. Butyl rubber, also known as polyisobutylene, is a synthetic rubber or elastomer primarily comprising isobutylene and to a much lesser extent, isoprene. Butyl rubbers have been found to exhibit a number of desirable qualities, including resistance against aging and low air permeability which makes these elastomers particularly suitable for use in modeling compounds when combined with compatible additives as described herein.

A halogenated butyl rubber, such as brominated (bromobutyl) rubber is specifically contemplated for use in the present invention as it is the most innocuous member of the butyl rubber family and, compared to butyl rubber, it can be covulcanized with other rubbers. A suitable bromobutyl rubber is commercially available under the trade name EXXON® Bromobutyl 2244. It will be apparent to those skilled in the art, however, that any member of the butyl rubber family, including butyl rubber and chlorobutyl rubber, may be utilized.

Vulcanized vegetable oil (VVO), in addition to butyl rubber is a further essential ingredient of the present invention. VVO, known industrially as factice, is a soft rubber material prepared by vulcanizing various vegetable oils, including linseed oil, soybean oil, sesame oil, rapeseed oil, canola oil and castor oil with sulfur or sulfur derivatives, such as sulfur chloride and the like. The product formed by reacting vegetable oil(s) with sulfur or a derivative thereof is preferred for the present invention. From the vulcanization process, a crosslinking is obtained resulting in a pseudo polymer oil base.

Vulcanized oils may be used as extenders, processing aids, or plasticizers for natural or synthetic rubbers. In combination with the butyl rubber component and other ingredients described herein, this polymerized oil causes the product to exhibit elastic and bounceable qualities while having a non-sticky, velvety tactile feel. The VVO also aids in the mixing or incorporation of other essential additives into the butyl rubber component. One preferred VVO, or factice, is Caufit Factis Blanco 5210, but any commercially available VVO is suitable for use with the present invention.

Based an the total weight of the compound, butyl rubber and VVO are preferably present in the following ranges:

| Ingredient | % By Weight |
| --- | --- |
| Butyl Rubber | 4.0–30.0 |
| Vulcanized Vegetable Oil | 4.0–30.0 |

The above-mentioned rubber composition also contains other conventional additives. For example, a sizable amount of at least one inorganic filler is incorporated into the mixture of butyl rubber and VVO to ultimately comprise from 25.0 to 60.0 percent of the total weight of the compound. A filler material imparts to the finished compound a necessary non-tackiness, so that it will not stick to skin or other mediums. The preferred filler, dolomite, has a compact structure, providing a final modeling compound having an improved tactile feel. Dolomite also increases the ability of the modeling compound to be utilized as an eraser. While dolomite, available under the trade name OMYACARB® is preferably utilized, it may be replaced by any carbonate or kaolin filler known in the art.

A softening agent is favorably incorporated in a proportion in the range from 5.0 to 15.0 percent of the total compound weight. The softening agent may be selected from a large group of commercially available materials, including oils, plasticizers, or other agents having a softening activity. For example, any commercially available vegetable oil may be incorporated into the mixture. Such an agent is desirable to enhance softness and malleability of the rubber compound. It has been discovered that food grade corn oil is particularly compatible with VVO, synergizing the soft feel of the compound. The enhanced softness makes the product especially suitable for molding by young children.

The modeling compound of the present invention preferably comprises an additional oil component. Particularly compatible with butyl rubbers are paraffinic oils, such as the commercially available Vaseline grade Plastificante RS-32-Vaseline. While oils are generally used in combination with rubber based compounds as softening agents, paraffinic oil in the range from about 3.0 to 15.0 percent weight of the composition acts more as an agglomerating agent, i.e., binding agent, to consolidate the compound into a more compact cohesive material. The use of paraffinic oil improves the elasticity and non-tearing properties of the resultant compound. In addition, it has been found to improve non-staining, color, and low temperature properties of the rubber.

Paraffinic oil imparts enhanced copying properties to the modeling compound as well, so that when placed on a section of newspaper or comic book, the wording or image is lifted and viewable on the surface of the modeling compound. It has also been found that paraffinic oils increase the rebound resilience of the compound. Typically, such qualities are only exhibited by borosiloxane bouncing or novelty putties.

Preferably, the composition also contains an antioxidant component. Antioxidants are commonly utilized in the art to prolong the shelf-life of malleable compositions. By blending a small amount of antioxidant, in the range from about 0.2 to 3.0 percent weight of the composition, with the rubber compound, it is possible to prevent thermal degradation of softening agents and protect the rubber from the loss of flexibility.

While the antioxidant component is not particularly limited, preferable antioxidants are phenolic antioxidants, and in particular, the general purpose antioxidant butylated hydroxytoluene (BHT). BHT, available as IONOL® CP, which has FDA and BGA approvals for materials which come into contact with food, is most desirable due to its non-toxic properties. The non-toxic BHT antioxidant, while preferred, may be replaced by any other antioxidant known to those skilled in the art as having the same performance.

A whitening pigment such as titanium dioxide ($TiO_2$) is also preferably used to improve the appearance of the modeling compound blend. Titanium dioxide in the range from 0.3 to 5.0 percent weight of the composition imparts a brighter whiteness to the compound, resulting in a material having a clean appearance and enabling it to more effectively lift printed images from a newspaper or the like. Titanium dioxide, commercially available as TiPure R-902, has been found to produce the aforementioned characteristics in the compound of the invention. Those skilled in the art would recognize, however, that any commercially available brand of titanium dioxide could be utilized.

In addition, other optional but preferable additives, including colorants and fragrances may be utilized in combination with the above-described modeling compound. Whether such additives are used is generally a matter of design choice to enhance the basic properties of the invention. The modeling compound of the present invention specifically contemplates the use of pigments, for example, Clariant non-black pigments, in the range from 0.0 to 2.0 percent weight of the composition. Advantageously, the utilization of pigments avoids the undesirable staining characteristic associated with some colorants that tend to transfer color or impart stains on users' hands. If desired, it may also be beneficial to use STERLING® V/N660 Carbon Black to impart a black color into the compound.

Blending a fragrance with the rubber compound mixture may also be desirable to decrease the rubber like scent commonly associated with conventional modeling compounds. While any non-toxic fragrance may be used, Bouquet 5123 has been found to be one suitable aromatizing mix, preferably present in the range from 0.2 to 0.6 weight percent.

The following EXAMPLE 1 illustrates the suitable ranges for a modeling compound in accordance with the present invention. All parts and percentages in the EXAMPLES and otherwise in the specification are by weight of the total compound.

EXAMPLE 1

| Ingredient | % By Weight (Acceptable Range) |
|---|---|
| Active: | |
| Butyl Rubber | 4.0–30.0 |
| Vulcanized Vegetable Oil | 4.0–30.0 |
| Filler | 25.0–60.0 |
| Paraffinic Oil | 3.0–15.0 |
| Softening Agent | 5.0–20.0 |
| Antioxidant | 0.2–3.0 |
| Titanium Dioxide | 0.3–5.0 |
| Other: | |
| Pigments | 0.0–2.0 |
| Aromatizing mixture | 0.2–0.6 |

The preferred percentages by weight of the above additives have been discovered to include those set forth in EXAMPLE 2. EXAMPLE 2 illustrates the preferred formulation of additives and corresponding percentages for producing a modeling compound most illustrative of the exemplary properties described herein. Manufactured in accordance with the method set forth below, the combination of ingredients in the preferred amounts results in a malleable, lightweight, non-hardening material having an improved tactile feel over conventional modeling compounds and putties. Importantly, while the improved compound is extremely pliable, it can retain a molded shape for years if undisturbed.

EXAMPLE 2

| Ingredient | Preferred Ingredient | % By Weight (Preferred Range) |
|---|---|---|
| Butyl Rubber | Bromobutyl Rubber | 17.0–19.0 |
| Vulcanized Vegetable Oil | | 17.0–19.0 |
| Filler | Dolomite | 41.0–43.0 |
| Paraffinic Oil | | 10.0–12.0 |
| Softening Agent | Corn Oil | 7.0–9.0 |
| Antioxidant | Butylated Hydroxy Toluene (BHT) | 0.3–0.4 |
| Titanium Dioxide | | 2.0–4.0 |
| Pigments | | 0.05–0.1 |
| Aromatizing mixture | | 0.2–0.4 |

When produced in accordance with the method of the invention, this combination of specific additives in the preferred amounts produces a velvety, non-oily, bounceable and cohesive compound which is advantageously stretchable in a manner similar to chewing gum. More specifically, the compound can be stretched substantially greater distances than conventional bouncing putties because the compound of the present invention is both cohesively bound together and maintains an excellent plastic/elastic ratio. Therefore, it is much less likely to break apart than conventional flexible putties when stretched from opposing ends. It has been found that in addition to a play material, the compound of the present invention may also be utilized for improving dexterity, stress relief and as a sculpting material.

To obtain a modeling compound with the advantageous properties and characteristics described, the present invention contemplates a tri-phase process for preparing the composition. The ingredients mentioned in EXAMPLES 1 and 2 are added or mixed in one or more of the three phases. It will be apparent to one skilled in the art, however, that other additives exhibiting similar characteristics to the preferred ingredients may replace those exemplified in the method herein. Other constituents of an equivalent nature known to those skilled in the art are considered within the teachings of this invention.

PHASE I of the method preferably comprises a premixture of bromobutyl rubber, BHT antioxidant, titanium dioxide, paraffinic oil, VVO and dolomite. With reference to the acceptable and preferred ranges in percentages by weight of the total composition, as set forth in EXAMPLES 1 and 2, the ingredients are combined in the following percentage amounts:

| | | PHASE I | | |
|---|---|---|---|---|
| Ingredient | Preferred Ingredient | % of Total From EXAMPLES 1 & 2 | % By Weight of Total Composition (Preferred) | % By Weight of Total Composition (Acceptable Range) |
| Butyl Rubber | Bromobutyl | 100 | 17.0–19.0 | 4.0–30.0 |
| Antioxidant | BHT | 100 | 0.3–0.4 | 0.2–3.0 |
| Titanium Dioxide | | 100 | 2.0–4.0 | 0.3–5.0 |
| Paraffinic Oil | | 90 | 9.0–10.8 | 2.7–13.5 |
| VVO | | 5 | 0.85–0.95 | 0.2–1.5 |
| Filler | Dolomite | 5 | 2.05–2.15 | 1.25–3.0 |

With particular reference to the preferred ingredients, the addition of the PHASE I ingredients in the above amounts promotes the dispersion of BHT and titanium dioxide into the bromobutyl rubber, facilitating the production of a flexible, whitened rubber compound. Another object of PHASE I is to soften the bromobutyl rubber by incorporating paraffinic oil therein, which further promotes the dispersion of ingredients into the rubber base. The ingredients comprising the modeling compound are preferably blended together at a slightly slow speed in an internal mixer, such as a BANBURY® Mixer. As would be understood by one skilled in the art, the mixing could also take place in an open mill or other sophisticated mixing apparatus. Advantageously, no heating or artificial temperature conditions are required to adequately combine the ingredients to form a cohesive compound.

In PHASE II of the present method, preferably about 50 percent of the total pre-mixture produced during PHASE I is combined with the ingredients set forth below in the following percentage amounts:

| | | PHASE II | | |
|---|---|---|---|---|
| Ingredient | Preferred Ingredient | % of Total From EXAMPLES 1 & 2 | % By Weight of Total Composition (Preferred) | % By Weight of Total Composition (Acceptable Range) |
| VVO | | 95 | 16.15–18.05 | 3.8–28.5 |
| Filler | Dolomite | 95 | 38.95–40.85 | 23.75–57.0 |
| Softening Agent | Corn Oil | 100 | 7.0–9.0 | 5.0–15.0 |
| Paraffinic Oil | | 10 | 1.0–1.2 | 0.3–1.5 |
| Pigments | | 100 | 0.05–0.1 | 0.0–2.0 |

During PHASE II, the continued softening of the bromobutyl rubber occurs with the slow mixing of the remaining paraffinic oil and corn oil. In addition, the desired pigments, while optional, are preferably mixed into the composition during PHASE II to promote their dispersion into the filler and the fraction of the pre-mixture present. The ingredients are blended until the pigments are evenly dispersed and an elastic, pliable compound is produced.

During PHASE ll, the remaining 50 percent of the pre-mixture is combined with 100 percent of the well-blended mixture produced during PHASE II. In addition, it is preferred that a fragrance in the range from about 0.2 to 0.6 percent of the total compound weight is mixed therein. After the compound is thoroughly mixed forming a cohesive, non-tacky unit, it may be extruded into the in desired amounts into suitable containers.

The non-toxic finished product, unlike conventional putties, is non-tacky, highly stretchable and can even be molded into tall, thin formations maintaining the ability to retain a formed shape.

In addition, the modeling compound of the present invention is extremely malleable and will not harden over time like conventional modeling compounds.

It should be understood that in addition to the preferred method of manufacturing this novel modeling compound, variations in the manner of admixing will become apparent to those skilled in the art.

It will also be understood that the preferred method outlined above utilizes specific additives discovered to provide a diverse and desirable combination of exemplary properties exhibited by a modeling compound. However, the present invention contemplates the use of such preferred ingredients and other ingredients having similar properties and characteristics.

For the foregoing reasons, the scope of this invention is to be defined by the appended claims.

What is claimed is:

1. A non-toxic, malleable modeling compound comprising:
    (a) about 4.0 to 30.0 percent by total weight of a butyl rubber; and
    (b) about 4.0 to 30.0 percent by total weight of a vulcanized vegetable oil.

2. The modeling compound of claim 1 further comprising about 25.0 to 60.0 percent by total weight of a filler.

3. The modeling compound of claim 1 further comprising about 5.0 to 15.0 percent by total weight of a softening agent.

4. The modeling compound of claim 1 further comprising about 0.2 to 3.0 percent by total weight of an antioxidant.

5. The modeling compound of claim 1 further comprising 3.0 to 15.0 percent total weight of a paraffinic oil.

6. The modeling compound of claim 1 further comprising 0.3 to 5.0 percent total weight of titanium dioxide.

7. The modeling compound of claim 1 wherein said butyl rubber is bromobutyl rubber.

8. The modeling compound of claim 1 further comprising 0.01 to 2.0 percent total weight of a coloring agent.

9. The modeling compound of claim 1 further comprising 0.2 to 0.6 percent total weight of a fragrance.

10. The modeling compound of claim 2 wherein said filler is selected from a group consisting of carbonate and kaolin fillers.

11. The modeling compound of claim 3 wherein said softening agent is corn oil.

12. The modeling compound of claim 4 wherein said antioxidant is selected from a group consisting of phenolic antioxidants.

13. A process for producing a non-toxic, malleable modeling compound comprising the steps of:
    (a) admixing on low speed in an internal mixer until thoroughly blended a pre-mixture including:
        about 4.0 to 30.0 percent total composition weight of a butyl rubber;
        about 0.2 to 3.0 percent total composition weight of an antioxidant;
        about 0.3 to 5.0 percent total composition weight of titanium dioxide;
        about 2.7 to 13.5 percent total composition weight of paraffinic oil;
        about 0.2 to 1.5 percent total composition weight of a vulcanized vegetable oil; and
        about 1.25 to 3.0 percent total composition weight of a filler;
    (b) thoroughly mixing to about 50.0 percent of the pre-mixture obtained during step (a):
        about 3.8 to 28.5 percent total composition weight of a vulcanized vegetable oil;

about 23.75 to 57.0 percent total composition weight of a filler material;

about 5.0 to 15.0 percent total composition weight of a softening agent;

about 0.3 to 1.5 percent total composition weight of a paraffinic oil;

(c) combining the remaining pre-mixture obtained during step (a) with the total mixture produced during step (b) and blending until thoroughly mixed.

14. The process of claim 13 further comprising the step of adding about 0.01 to 2.0 percent total composition weight of a coloring agent.

15. The process of claim 13 further comprising the step of adding about 0.2 to 0.6 percent total composition weight of a fragrance.

16. A process for producing a non-toxic, malleable modeling compound comprising the steps of:

(a) Admixing on low speed in an internal mixer until thoroughly blended a pre-mixture including:

about 17.0 to 19.0 percent total composition weight of butyl rubber;

about 0.3 to 0.4 percent total composition weight of an antioxidant:

about 2.0 to 4.0 percent total composition weight of titanium dioxide;

about 9.0 to 10.8 percent total composition weight of paraffinic oil;

about 0.85 to 0.95 percent total composition weight of a vulcanized vegetable oil; and about 2.05 to 2.15 percent total composition weight of a filler;

(b) thoroughly mixing to about 50.0 percent of the pre-mixture obtained during step (a):

about 16.15 to 18.05 percent total composition weight of a vulcanized vegetable oil;

about 38.95 to 40.85 percent total composition weight of a filler material;

about 7.0 to 9.0 percent total composition weight of a softening agent;

about 1.0 to 1.2 percent total composition weight of a paraffinic oil;

(c) combining the remaining pre-mixture obtained during step (a) with the total mixture produced during step (b) and blending until thoroughly mixed.

17. The process of claim 16 further comprising the step of adding about 0.05 to 0.1 percent total composition weight of a coloring agent.

18. The process of claim 16 further comprising the step of adding about 0.2 to 0.4 percent total composition weight of a fragrance.

* * * * *